(12) United States Patent  (10) Patent No.: US 7,894,451 B2
Parker et al.  (45) Date of Patent: Feb. 22, 2011

(54) METHOD OF PROVIDING VIRTUAL ROUTER FUNCTIONALITY (75) Inventors: David K. Parker, Cheltenham (GB); Denton Gentry, Fremont, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 790 days.

(21) Appl. No.: 11/324,159

(22) Filed: Dec. 30, 2005

(65) Prior Publication Data

US 2007/0153808 A1   Jul. 5, 2007

(51) Int. Cl.
*H04L 12/28* (2006.01)
*H04L 12/56* (2006.01)

(52) U.S. Cl. .................. 370/395.32; 370/351; 370/389; 370/392; 370/395.31

(58) Field of Classification Search ................. 370/230, 370/352, 356, 379, 389, 392, 393; 455/450; 713/182
See application file for complete search history.

(56) References Cited

U.S. PATENT DOCUMENTS

| | | | |
|---|---|---|---|
| 5,072,443 A | 12/1991 | Hahne et al. | |
| 5,282,270 A | 1/1994 | Oppenheimer et al. | |
| 5,473,599 A | 12/1995 | Li et al. | |
| 5,764,636 A | 6/1998 | Edsall | |
| 5,852,607 A | 12/1998 | Chin | |
| 5,923,660 A | 7/1999 | Shemla et al. | |
| 5,999,518 A | 12/1999 | Nattkemper et al. | |
| 6,034,957 A | 3/2000 | Haddock et al. | |
| 6,098,109 A | 8/2000 | Kotzur et al. | |
| 6,172,980 B1 | 1/2001 | Flanders et al. | |
| 6,173,333 B1 | 1/2001 | Jolitz et al. | |
| 6,208,649 B1 * | 3/2001 | Kloth ......................... 370/392 |
| 6,256,314 B1 | 7/2001 | Rodrig et al. | |
| 6,275,861 B1 | 8/2001 | Chaudri et al. | |
| 6,295,299 B1 | 9/2001 | Haddock et al. | |
| 6,351,801 B1 | 2/2002 | Christie et al. | |
| 6,362,990 B1 * | 3/2002 | Gibson et al. ............... 365/49.1 |

(Continued)

FOREIGN PATENT DOCUMENTS

CN   1604568   4/2005

(Continued)

OTHER PUBLICATIONS

Van Ess, D., *A Circular FIFO, PSoC Style*, Cypress Microsystems, Application Note AN2036, Rev. B, pp. 1-5, Jun. 21, 2002.

(Continued)

*Primary Examiner*—Jayanti K Patel
*Assistant Examiner*—Christopher T Wyllie
(74) *Attorney, Agent, or Firm*—Blakely, Sokoloff, Taylor & Zafman (57) ABSTRACT

A method of presenting different virtual routers to different end users, classes of service, or packets is provided. An incoming packet is received having a VLAN field and at least one additional field. A key is formed from the VLAN field and at least one other packet field, and mapped into a virtual router identifier (VRID) using an indirection mapping process. The VRID identifies a particular virtual router configuration from a plurality of possible virtual router configurations. A networking device is configured to have the particular virtual router configuration identified by the VRID, and the packet is then forwarded by the configured device.

27 Claims, 5 Drawing Sheets

U.S. PATENT DOCUMENTS

| | | | |
|---|---|---|---|
| 6,381,162 B1* | 4/2002 | Peterson | 365/49.15 |
| 6,381,242 B1 | 4/2002 | Maher, III et al. | |
| 6,384,750 B1* | 5/2002 | Brown | 341/106 |
| 6,397,260 B1 | 5/2002 | Wils et al. | |
| 6,463,067 B1 | 10/2002 | Hebb et al. | |
| 6,515,963 B1* | 2/2003 | Bechtolsheim et al. | 370/229 |
| 6,553,002 B1 | 4/2003 | Bremer et al. | |
| 6,570,877 B1 | 5/2003 | Kloth et al. | |
| 6,631,465 B1 | 10/2003 | Chen et al. | |
| 6,658,002 B1* | 12/2003 | Ross et al. | 370/392 |
| 6,661,791 B1* | 12/2003 | Brown | 370/392 |
| 6,735,670 B1* | 5/2004 | Bronstein et al. | 711/108 |
| 6,738,892 B1 | 5/2004 | Coon et al. | |
| 6,763,023 B1 | 7/2004 | Gleeson et al. | |
| 6,765,881 B1 | 7/2004 | Rajakarunanayake | |
| 6,792,502 B1* | 9/2004 | Pandya et al. | 711/108 |
| 6,842,791 B2 | 1/2005 | Navada et al. | |
| 6,871,262 B1 | 3/2005 | Oren et al. | |
| 6,882,642 B1 | 4/2005 | Kejriwal et al. | |
| 6,888,797 B1 | 5/2005 | Cao et al. | |
| 6,914,905 B1* | 7/2005 | Yip et al. | 370/395.53 |
| 6,917,617 B2 | 7/2005 | Jin et al. | |
| 6,957,258 B2 | 10/2005 | Maher, III et al. | |
| 6,975,581 B1 | 12/2005 | Medina et al. | |
| 6,976,158 B2 | 12/2005 | Catherwood et al. | |
| 6,980,552 B1 | 12/2005 | Belz et al. | |
| 6,999,462 B1* | 2/2006 | Acharya | 370/401 |
| 7,062,398 B1 | 6/2006 | Rothberg | |
| 7,062,641 B1 | 6/2006 | Devanagondi et al. | |
| 7,079,407 B1 | 7/2006 | Dimitrelis | |
| 7,092,354 B2 | 8/2006 | Jensen | |
| 7,111,101 B1 | 9/2006 | Bourke et al. | |
| 7,139,271 B1* | 11/2006 | Parruck et al. | 370/392 |
| 7,152,191 B2 | 12/2006 | Kessler et al. | |
| 7,154,902 B1* | 12/2006 | Sikdar | 370/412 |
| 7,190,696 B1 | 3/2007 | Manur et al. | |
| 7,212,837 B1* | 5/2007 | Calhoun et al. | 455/560 |
| 7,248,584 B2 | 7/2007 | Hooper | |
| 7,248,585 B2 | 7/2007 | Kohn et al. | |
| 7,260,648 B2 | 8/2007 | Tingley et al. | |
| 7,274,693 B1* | 9/2007 | Kloth et al. | 370/389 |
| 7,286,520 B2 | 10/2007 | Takeda et al. | |
| 7,296,100 B1 | 11/2007 | Venkatesh et al. | |
| 7,304,996 B1 | 12/2007 | Swenson et al. | |
| 7,444,405 B2 | 10/2008 | Gangadharan | |
| 7,487,938 B2 | 2/2009 | Brady et al. | |
| 7,515,589 B2 | 4/2009 | Bacher et al. | |
| 7,561,531 B2 | 7/2009 | Lewites et al. | |
| 2001/0005876 A1* | 6/2001 | Srinivasan et al. | 711/108 |
| 2001/0015976 A1* | 8/2001 | Harasawa et al. | 370/391 |
| 2001/0025315 A1 | 9/2001 | Jolitz | |
| 2001/0028651 A1* | 10/2001 | Murase | 370/392 |
| 2001/0048661 A1 | 12/2001 | Clear et al. | |
| 2002/0184387 A1 | 12/2002 | Yamaya et al. | |
| 2002/0191605 A1 | 12/2002 | Lunteren et al. | |
| 2003/0005210 A1* | 1/2003 | Thummalapally et al. | 711/1 |
| 2003/0026259 A1 | 2/2003 | Brown | |
| 2003/0028713 A1* | 2/2003 | Khanna et al. | 711/108 |
| 2003/0069973 A1 | 4/2003 | Ganesan et al. | |
| 2003/0154380 A1* | 8/2003 | Richmond et al. | 713/182 |
| 2003/0165144 A1 | 9/2003 | Wang | |
| 2003/0169612 A1* | 9/2003 | Hu | 365/49 |
| 2003/0193949 A1 | 10/2003 | Kojima et al. | |
| 2004/0003110 A1 | 1/2004 | Ozguner | |
| 2004/0015683 A1 | 1/2004 | Emma et al. | |
| 2004/0100956 A1 | 5/2004 | Watanabe | |
| 2004/0120173 A1* | 6/2004 | Regev et al. | 365/49 |
| 2004/0202162 A1* | 10/2004 | Vu | 370/390 |
| 2004/0205056 A1 | 10/2004 | Mori et al. | |
| 2004/0205753 A1 | 10/2004 | Moore | |
| 2004/0208197 A1* | 10/2004 | Viswanathan | 370/466 |
| 2004/0246981 A1* | 12/2004 | He et al. | 370/419 |
| 2004/0258062 A1 | 12/2004 | Narvaez | |
| 2005/0055339 A1* | 3/2005 | Richardson | 707/3 |
| 2005/0074009 A1* | 4/2005 | Kanetake et al. | 370/392 |
| 2005/0180429 A1 | 8/2005 | Ghahremani et al. | |
| 2005/0190639 A1* | 9/2005 | Hu | 365/232 |
| 2005/0198362 A1 | 9/2005 | Navada et al. | |
| 2005/0226242 A1 | 10/2005 | Parker | |
| 2005/0281191 A1 | 12/2005 | McGee et al. | |
| 2006/0007917 A1* | 1/2006 | Saito et al. | 370/352 |
| 2006/0039374 A1 | 2/2006 | Belz et al. | |
| 2006/0056420 A1 | 3/2006 | Okuda et al. | |
| 2006/0092950 A1 | 5/2006 | Arregoces et al. | |
| 2006/0106934 A1 | 5/2006 | Figaro et al. | |
| 2006/0233168 A1 | 10/2006 | Lewites et al. | |
| 2007/0291791 A1* | 12/2007 | English et al. | 370/469 |
| 2008/0034112 A1 | 2/2008 | Imai et al. | |
| 2008/0075078 A1 | 3/2008 | Watanabe | |
| 2008/0186968 A1 | 8/2008 | Farinacci et al. | |
| 2008/0205264 A1 | 8/2008 | Rorie | |
| 2008/0222094 A1 | 9/2008 | Cox | |

FOREIGN PATENT DOCUMENTS

WO    WO 03/081857    10/2003

OTHER PUBLICATIONS

Network Working Group, *RFC 1071—Computing the Internet Checksum*, Sep. 1988, available at: http://www.faqs.org/rfcs/rfc1071.html.

Network Working Group, *RFC 1141—Incremental Updating of the Internet Checksum*, Jan. 1990, available at: http://www.faqs.org/rfcs/rfc1141.html.

Network Working Group, *RFC 1624—Computation of the Internet Checksum via incremental update*, May 1994, available at: http://www.faqs.org/rfcs/rfc1624.html.

Netlogic Microsystems, Product Brief NSE5000GLQ, Copyright 2004, available at: http://www.netlogicmicro.com/datasheets/nse5000glq.html.

Zhang, Z., *Recovery of Memory and Process in DSM Systems: HA Issue #1*, Hewlett-Packard Co. HPL-2001-76, Mar. 30, 2001.

Non-Final Office Action for U.S. Appl. No. 11/324,209 Mailed Jan. 21, 2010, 23 Pages.

Final Office Action for U.S. Appl. No. 11/324,209, Mailed Jul. 21, 2009, 19 Pages.

Non-Final Office Action for U.S. Appl. No. 11/324,209 Mailed Oct. 30, 2008, 23 Pages.

Non-Final Office Action for European Application No. 06846017.9 Mailed Apr. 21, 2010, 6 Pages.

Office Action for Chinese Patent Application No. 200680050164.9 mailed Aug. 4, 2010, 19 pages.

* cited by examiner

- 604 — TYPE [3 bits]  PORT [6 bits]  = 9 bits total
- 606 — TYPE [3 bits]  VLAN ID [12 bits]  = 15 bits total
- 608 — TYPE [3 bits]  VMAN ID [12 bits]  = 15 bits total
- 610 — TYPE [3 bits]  VLAN ID [12 bits]  PORT [6 bits]  = 21 bits total
- 612 — TYPE [3 bits]  VLAN ID [12 bits]  VMAN ID [12 bits]  = 27 bits total
- 614 — TYPE [3 bits]  VLAN ID [12 bits]  VMAN ID [12 bits]  PORT [6 bits]  = 33 bits total

METHOD OF PROVIDING VIRTUAL ROUTER FUNCTIONALITY

This application is related to U.S. patent application Ser. No. 11/324,209, entitled "MAC ADDRESS DETECTION DEVICE FOR VIRTUAL ROUTERS," filed concurrently herewith; U.S. patent application Ser. No. 11/323,998, entitled "METHOD OF PROVIDING VIRUTAL ROUTER FUNCTIONALITY THROUGH ABSTRACTED VIRTUAL IDENTIFIERS," filed concurrently herewith; and U.S. patent application Ser. No. 11/324,205, entitled "METHOD OF EXTENDING DEFAULT FIXED NUMBER OF PROCESSING CYCLES IN PIPELINED PACKET PROCESSOR ARCHITECTURE," filed concurrently herewith, each of which is hereby incorporated by reference herein as though set forth in full.

BACKGROUND OF THE INVENTION

1. Field of the Invention

This application relates generally to networking devices, and, specifically, to methods for configuring such devices so that they provide virtual router functionality, i.e., present different virtual router configurations to different end users, classes of service or packets.

2. Related Art

Virtual router functionality refers to the capability of the same physical networking device to present different virtual router configurations to different end users, classes of desired service, or packets. As a result of this capability, the same physical device appears as a plurality of different virtual routers. To implement this capability, current routers directly map a packet field of interest, typically the VLAN field, into the identifier of a particular routing table, and then use the particular routing table to route the packet. The VLAN field designates a virtual LAN, a collection of network elements that may be physically disparate but are logically related such that they may be considered part of the same LAN for OSI layer two routing/switching purposes. For example, all the network elements in a particular VLAN receive broadcasts from any other element in the VLAN at OSI layer two.

This approach, whereby the VLAN of the incoming packet is directly mapped into an identifier of a routing table, worked fine as long as different end users used non-overlapping VLANs, so that the VLAN could be used to present different virtual routers to different end users. However, as VLAN usage proliferated, different end users began using overlapping sets of VLANs, so the VLAN could no longer be used to present different virtual routers to different end users.

Another problem is that the number of virtual routers that are possible is limited by the size of the VLAN field. A VLAN of 12 bits, for example, identifies only 4 K different routing tables, which may not be sufficient for certain applications.

A third problem is the lack of flexibility in this approach. If, for example, the VLAN type or format changes as network usage evolves or as network standards change, the approach would be rendered obsolete as it is tied to a particular VLAN type and format.

A fourth problem is the lack of scalability of this approach with an increase in the number of virtual routers that may need to be accommodated. With this approach, for example, an increase in the size of the VLAN field to allow for an increase in virtual routers multiplies in direct proportion the number of routing tables that need to be maintained.

SUMMARY

The invention provides a method of presenting different virtual routers to different end users, classes of service, or packets. The method may be performed in any networking device, and enables the device to provide virtual router functionality.

The method begins when a packet is received having a VLAN field and at least one additional field. Upon receipt of the packet, a key is formed from the VLAN field and at least one additional packet field, for example, a VMAN field.

The key is then mapped into a virtual router identifier (VRID) using an indirection mapping process. According to this indirect mapping process, a table having a plurality of entries, each having a content value and an index value, is accessed to locate an entry having a content value that matches the key. The index value of the matching entry is then mapped into the VRID using an associated data store element. The result is a virtual router identifier that identifies a particular virtual router configuration from a plurality of possible virtual router configurations.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
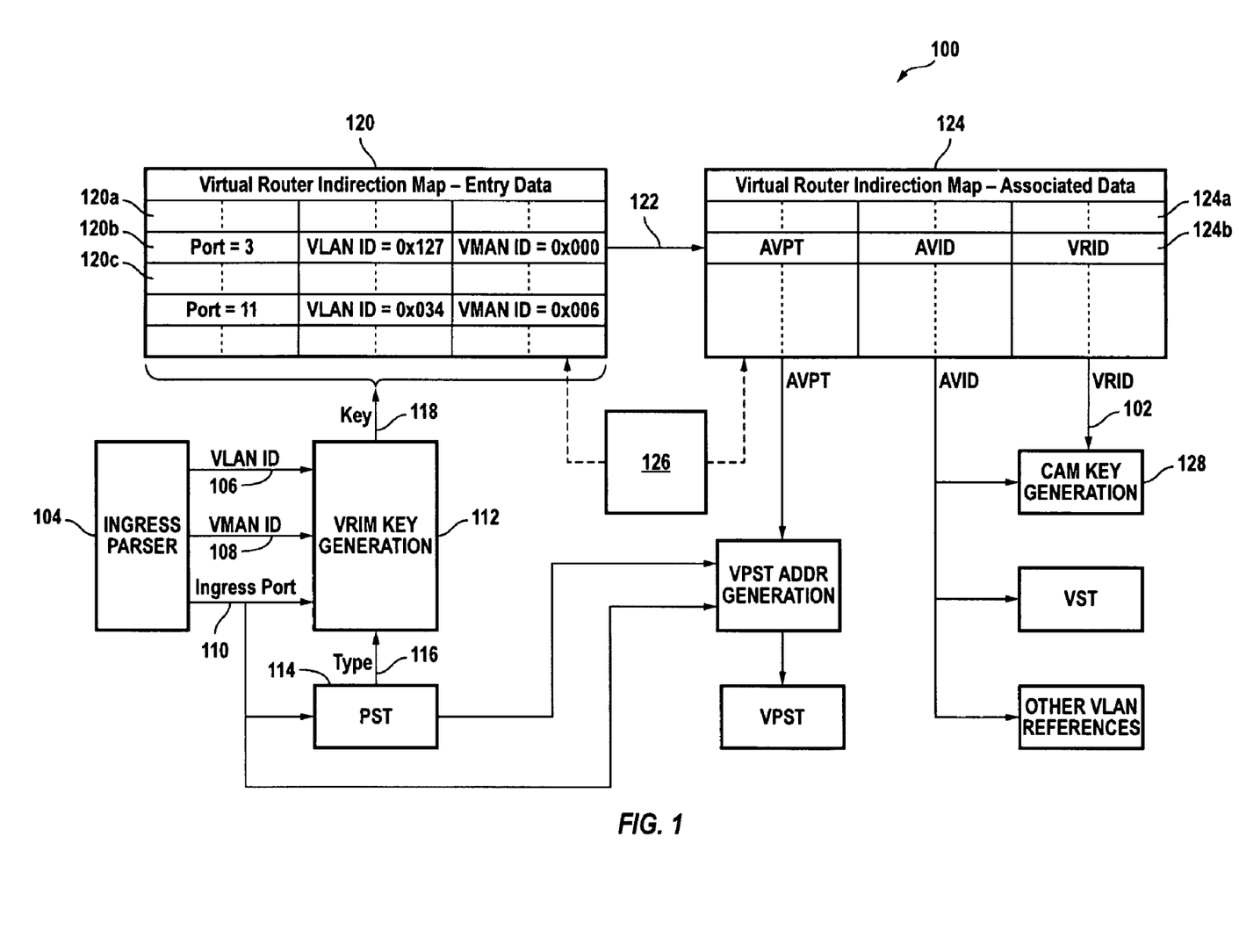
FIG. 1 is a block diagram showing the method steps, data structures and logic elements used in producing a virtual router identifier (VRIID) according to one embodiment, characterized in that an indirect mapping process is used to map a key, generated from one or more packet fields, to the VRID.

Referring to FIG. 1, a block diagram depicting the steps of a method 100, performed in a networking device, of presenting different virtual router configuration to different end users, classes of service, or packets. Also shown are the data structures used in the performance of the method, and the logic elements that perform the method steps. In this particular embodiment, the method is performed in the device after the packet has been parsed by packet parser 104, thus making available for use by the method certain packet fields successfully parsed by the parser 104, including VLAN 106, VMAN 108, and ingress port 110. The method may be performed in any networking device that is capable of forwarding or classifying packets at OSI layer three or above, including but not necessarily limited to routers, switches, or combination routers/switches. For purposes of this disclosure, a "virtual router" includes both a "lightweight" virtual router, i.e., one that virtually routes at OSI layer three, and a "heavyweight" virtual router, i.e., one that virtually routes at OSI layer three, but in addition implements distinct OSI layer two functions per virtual router. Additionally, for purposes of this disclosure, the singular terms "device" or "router" include plural devices or routers, respectively.

As previously explained, the VLAN field 106 designates a virtual LAN, a collection of network elements that may be physically disparate but are logically related such that they may be considered part of the same LAN for OSI layer two routing/switching purposes. Presently, the primary usage of the VLAN terminology is to uniquely identify logically related end user equipment within a VMAN (see below).

The VMAN field 108 designates a virtual metropolitan network, a collection of network elements that may be physically disparate but are logically related such that they may be considered part of the same network. Although the term originally applied only to metropolitan networks, that usage has evolved such that the term is now used to designate any network, metropolitan or non-metropolitan. In fact, as VMAN usage has proliferated, the term is now primarily used by service providers to designate logically related infrastructure equipment. At the same time, as explained above, the VLAN terminology is now primarily used to uniquely identify logically related end user equipment within a VMAN. Significantly, as a VLAN value uniquely identifies a VLAN within a VMAN, the same VLAN value may not be used to refer to different end user equipment within a VMAN.

The ingress port number 110 is an identifier of the physical port on which the packet was received at the device.

Returning to FIG. 1, the object of the method is to determine a virtual router identifier (VRID) 102 responsive to the incoming packet, wherein the virtual router identifier 102 identifies a particular virtual router configuration from a plurality of possible virtual router configurations.

Figure 2A:
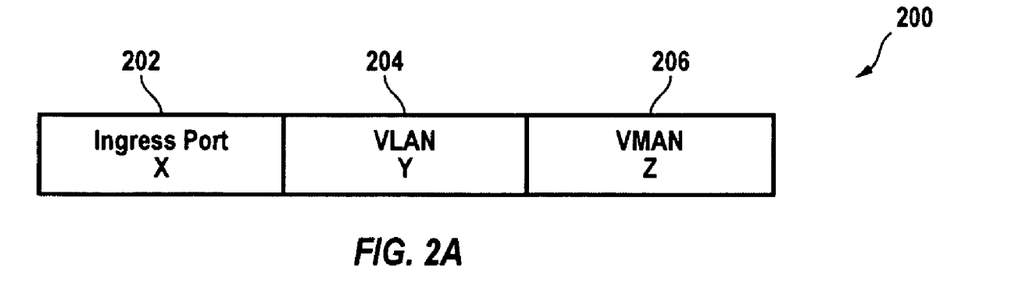
FIG. 2a illustrates an example of a key format.

The method begins when key generation logic 112 forms a key from the VLAN 106, VMAN 108 and ingress port 110 fields. In the particular embodiment illustrated, the key is formed by concatenating these three fields together, although it should be appreciated that other methods of forming the key are possible. Thus, for example, in one embodiment, an incoming packet received over ingress port X, having a VLAN of Y, and a VMAN of Z, has a key 200 formatted as illustrated in FIG. 2a, with three concatenated fields, the first field 202 holding ingress port X, the second field 204 holding VLAN Y, and the third field 206 holding VMAN Z.

Figure 2B:
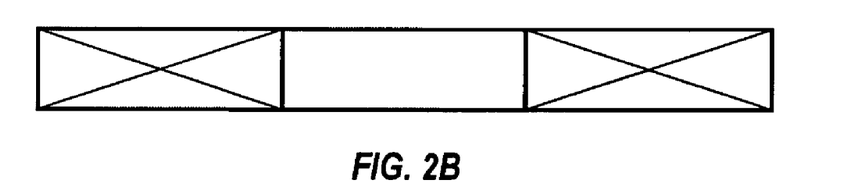
FIGS. 2b-2e illustrate various examples of key types wildcarding different ones of the fields making up the key format.
Figure 2C:
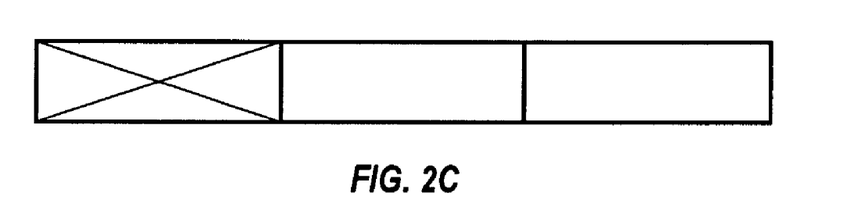
Figure 2D:
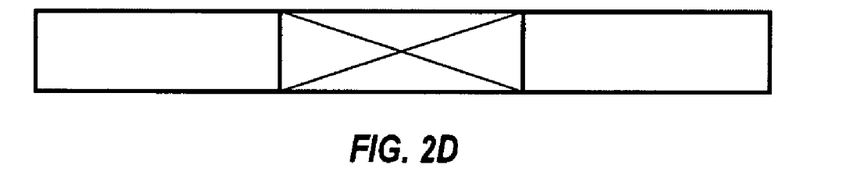
Figure 2E:
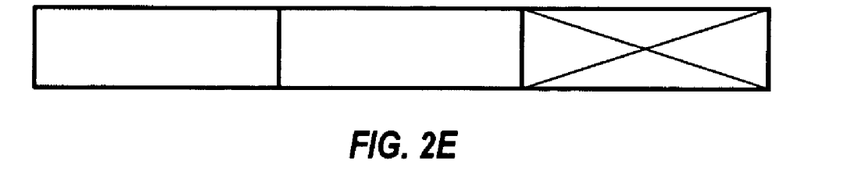

Concurrently, in one embodiment, the ingress port 110 is input to a lookup table 114 to determine a key type 116. In this embodiment, the key type functions as a mask, by indicating which of the three fields of the key are to be wildcarded, i.e., ignored in the subsequent processing, and which are to be used. In this particular embodiment, each of the three fields can be independently wild-carded or not. Thus, for example, FIG. 2b illustrates a key type in which the ingress port and VMAN fields are wildcarded (designated by the X appearing in the corresponding fields), and only the VLAN field used in the subsequent processing. Similarly, FIG. 2c illustrates a key type in which the ingress port field is wildcarded, and the VLAN and VMAN fields are used in the subsequent processing. FIG. 2d illustrates a key in which the VLAN field is wildcarded, and the ingress port and VMAN fields are used in the subsequent processing. FIG. 2e illustrates a key in which the VMAN field is wildcarded, and the ingress port and VLAN fields are used in the subsequent processing.

In the embodiment illustrated in FIG. 1, the key type 116 is determined responsive to the ingress port field 110, which forms the input to lookup table 114. The table 114 has a plurality of entries each having an index value and a content value that specifies a particular key type, for example, such as illustrated in FIGS. 2b-2e. A lookup occurs by mapping the ingress port field 110 into a particular index, looking up the entry having that index, and setting the key type to the content value of that entry. In other embodiments, the key type may be determined responsive to other packet fields and more than one packet field.

Figure 6A:
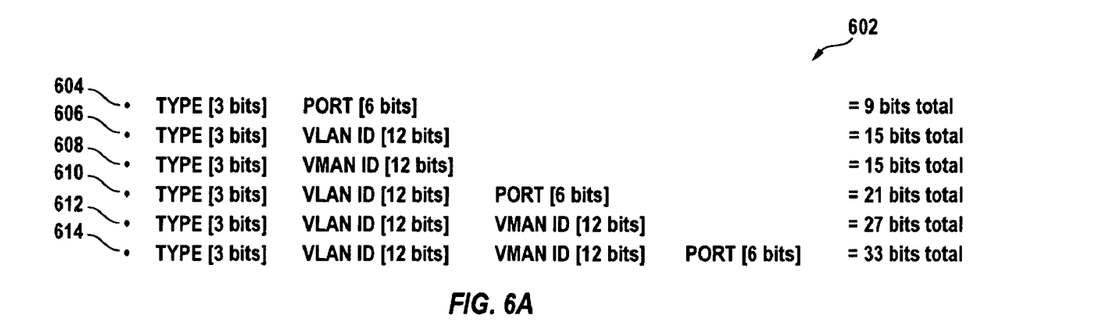
FIGS. 6a, 6b and 6c illustrate examples of alternative data types that may apply depending on the type of VLAN field detected in the ingress packet.

FIG. 6a illustrates an implementation where the key type is a 3 bit field, identified with numeral 602, that is appended to the key, and indicates both the format of the key and which fields of the key are to be wildcarded. For example, the key type for key 604 indicates both that the key is 9 bits, and that the VLAN and VMAN fields are to be wildcarded; the key type for key 606 indicates both that the key is 15 bits, and that the ingress port and VMAN fields are to be wildcarded; the key type for key 608 indicates both that the key is 15 bits, and that the ingress port and VLAN fields are to be wildcarded; the key type for key 610 indicates both that the key is 21 bits, and that the VMAN field is to be wildcarded; the key type for key 612 indicates both that the key is 27 bits, and that the ingress port field is to be wildcarded; and the key type for key 614 indicates that the key is 33 bits, and that none of the fields are to be wildcarded.

Moreover, as will be discussed in greater detail below, in the case where a ternary CAM is used to perform the indirection mapping process, whereby the key is indirectly mapped into a virtual router identifier, just discussed key type generation and key masking processes are unnecessary as individual fields in the content values corresponding to the ternary CAM entries can be wildcarded, i.e., set as don't care values. In the case where a binary CAM is used to perform the indirection mapping process, the just discussed key type generation and key masking processes should generally be retained.

Referring again to FIG. 1, the key 118, masked or unmasked as the case may be, is then mapped into the virtual router identifier 102 using a two-step indirection mapping process performed by logic 126. In the first step, as illustrated, a table 120 is accessed, the table having a plurality of entries 120a, 120b, 120c, each having a content value and an index value, and locating an entry having a content value that matches the key. In FIG. 1, the content value of entry 120b is shown as matching the key 118. The index value of the matching entry, identified with numeral 122, forms an input to the second step of the process.

In the second step, the index value 122 of the matching entry 120b is mapped into the virtual router identifier 102 using an associated data store element 124. The associated data store element 124 has a plurality of entries 124a, 124b, each having an index value and a content value. In one embodiment, the mapping is performed by selecting the entry in the associated data store element 124 whose index value matches the index value 122 for the matching entry in the table 120. In the particular example illustrated in FIG. 1, entry 124b satisfies this condition. The content value of this entry is or contains the virtual router identifier 102.

In one implementation, the table 120 is stored on a CAM, and the first step of the two-step process occurs by having the CAM search for and locate the entry 120b whose content value matches the key 118. In the case where the CAM is a binary CAM, i.e., a CAM where each bit in the content value of an entry can only take on the binary values "0" and "1," the previously described key type generation and masking processes should generally be performed as these functions are not available through the CAM. However, in the case where the CAM is a ternary CAM, i.e., a CAM where each bit in the content value of an entry can take on the binary values "0" and "1," but also a "don't care" value, the previously described key type generation and masking processes are optional as these functions may be performed through suitable settings of the content values of the CAM entries.

In a second implementation, the table 120 is stored in RAM, and the first step of the two-step process occurs by applying a hash function to the key 118 to determine a table index for a starting entry, and then searching the table 120, beginning with the starting entry, to locate the entry 120b whose content value matches the key 118.

Logic 128 configures the device in accordance with the VRID 102, and the configured device then forwards the packet. In one embodiment, as will be discussed in more detail later, logic 128 selects or generates a CAM searching key responsive to the VRID 102. The CAM searching key is used in making a classification and forwarding decision for the packet. By setting the key that is used throughout the classification and forwarding process responsive to the VRID 102, the logic 128 in effect selects the routing table that is used to route the packet.

The foregoing embodiment overcomes the problems identified at the outset with the conventional approach for providing virtual router functionality. First, since a key can be formed from a combination of a VLAN and VMAN field, and a VLAN is a unique identifier within a particular VMAN, the embodiment allows the VLAN to be used once again for virtual routing purposes.

Second, the embodiment dramatically increases the number of virtual routers that are possible. In the case, for example, where the table 120 is stored on a CAM, the number of virtual routers that can be presented is limited only by the size of the CAM. No longer does the size of the VLAN field limit the number of virtual routers than can be supported.

Figure 6B:
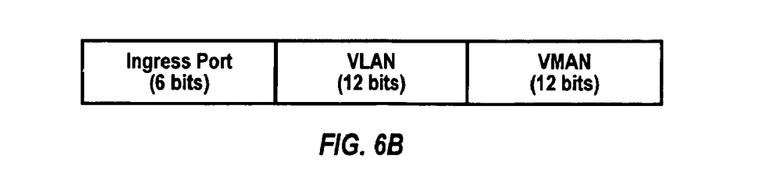
Figure 6C:
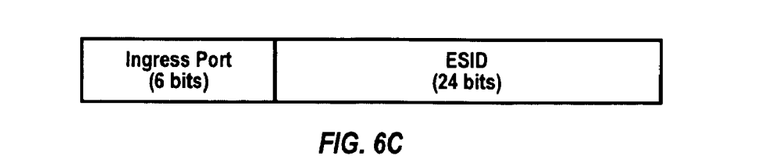

Third, the embodiment is flexible and easily accommodates changes in network usage or standards. Consider, for example, the recent addition of a super-wide (24 bit) VLAN field, i.e., the ESID field, to the list of permissible Ethertypes. That is handled simply by defining a new key type in the lookup table 114. For example, while the normal data type might have the format illustrated in FIG. 6b, i.e., 12 bits for each of the VLAN, and VMAN fields, and 6 bits for the ingress port field, when a super-wide VLAN (ESID) is detected, the data type 116 might have the format illustrated in FIG. 6c, i.e., a 6 bit ingress port field followed by a 24 bit ESID field. Upon encountering the key type of FIG. 6c, logic 112 in FIG. 1 would format the key as indicated in this figure responsive to the fields 106, 108 and 110 from the packet parser, i.e., it would assume the VLAN field 106 is a 24 bit ESID field.

Fourth, the embodiment is scaleable as an increase in the number of possible virtual routers would not necessarily require a commensurate increase in the number of routing tables that are maintained. Instead, many different key values could be mapped into the same VRID through appropriate settings of the index values associated with the entries 120a, 120b, 120c in the table 120. For example, in FIG. 1, if it were desired that the index values for entries 120b and 120c map into the same VRID, the index values for the entries 120b and 120c would be set to the same value.

Figure 3:
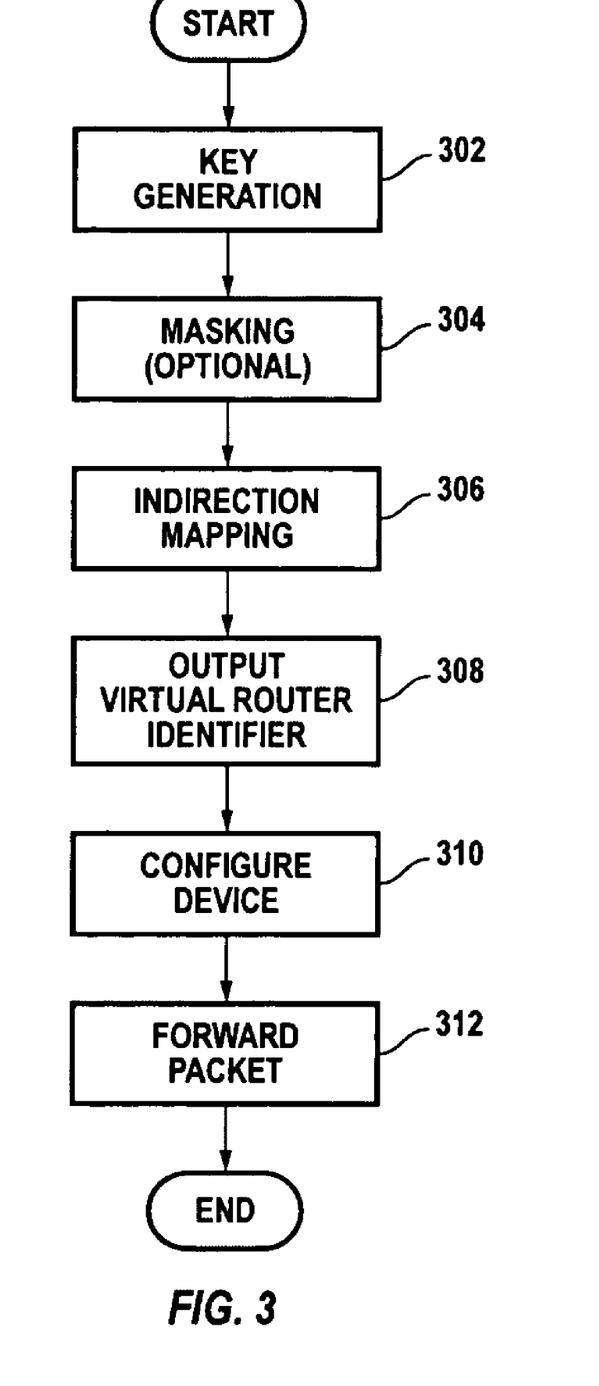
FIG. 3 is a flowchart illustrating the method steps in one embodiment, characterized in that the networking device is configured responsive to the VRID, and the packet then routed in accordance with the configured device.

FIG. 3 summarizes the steps that are performed in one embodiment of the overall method. Step 302 comprises the key generation step performed by the logic 112 in FIG. 1. Step 304 comprises the optional key type generation and masking processes performed by the logic 112 in FIG. 1, with the key type determined through an access to lookup table 112. For purposes of this disclosure, the term "logic" refers to implementations in hardware, software, or combinations of hardware and software.

Step 306 comprises the two-step indirection mapping process, wherein the first step involves searching or having performed a search through table 120, which may or may not be stored on a CAM, to find the entry 120b whose content value matches the key 118, and the second step involves locating the entry 124b in the associated data store 124, typically a RAM, whose index value matches the index value 122 of the matching entry in the table 120. Step 308 comprises outputting the virtual router identifier (VRID) 102. In FIG. 1, this step involves outputting the content value, or a designated field in the content value, of the entry 124b whose index value matches the index value 122 of the matching entry in the table 120.

Steps 306 and 308 are performed by logic 126 (illustrated in FIG. 1) through suitable accesses to table 120 and associated data element 124, as indicated by the dotted arrows between these elements.

Figure 5:
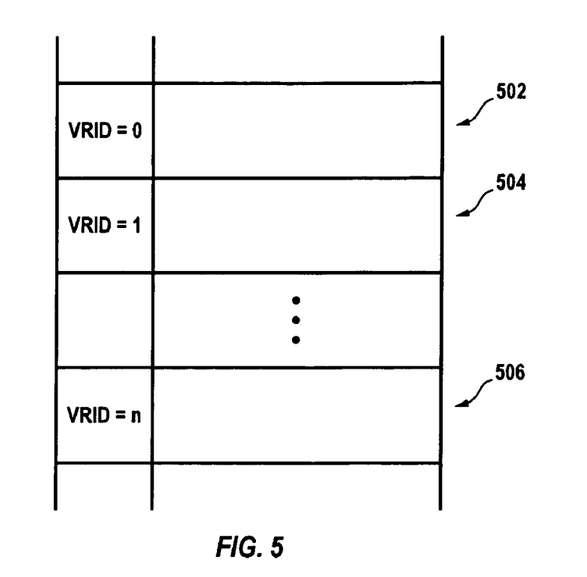
FIG. 5 illustrates a plurality of routing tables that may be used to support virtual router functionality.

Step 310 comprises configuring the device to have the particular configuration identified by the virtual router identifier. In one embodiment, this step is performed by logic 128 (illustrated in FIG. 1) when it selects or generates the CAM searching key that is used in making a classification and forwarding decision for the packet. By setting the key that is used throuput the classification and forwarding process, the logic 128 in effect selects a routing table from a plurality of routing tables for use in routing the packet. Conceptually, the process is as illustrated in FIG. 5, which shows selecting a routing table, for example, table 504, from a plurality of possible routing tables 502, 504, 506 responsive to the VRID, and preparing to forward the packet of interest using the selected routing table.

Referring back to FIG. 3, step 312 comprises forwarding the packet in accordance with the configured device. In one embodiment, this step is performed by a packet processor in the device. For purposes of this disclosure, the term "processor" refers to any device capable of executing one or more commands, instructions or state transitions, and includes, without limitation, a general- or special-purpose microprocessor, finite state machine, controller, computer, digital signal processor (DSP), or the like.

Figure 4:
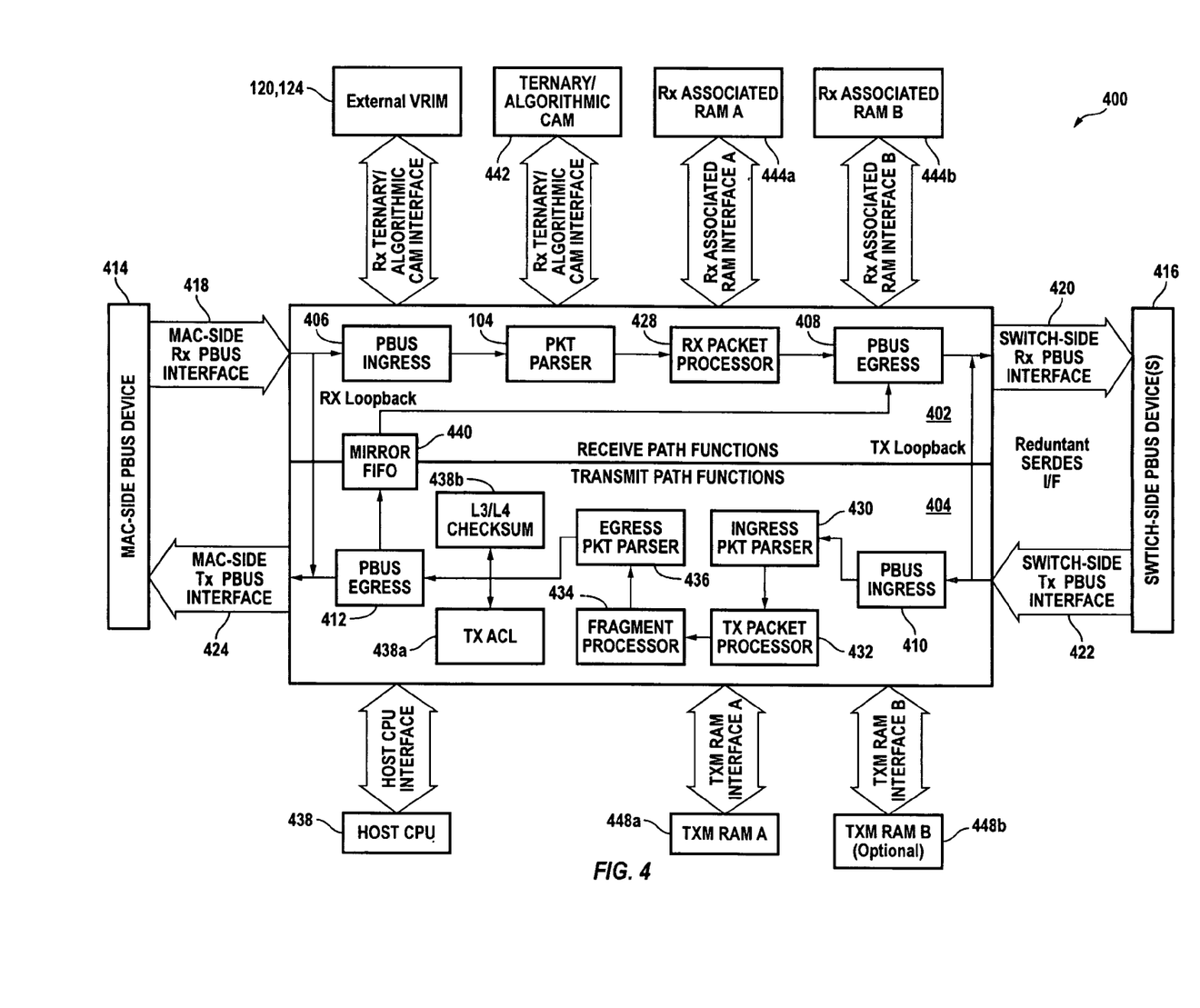
FIG. 4 illustrates a particular switch architecture that embodies or utilizes the claimed method and system.

FIG. 4 illustrates an embodiment 400 of a particular router architecture in which the aforementioned method may operate. In this embodiment, as shown, the router is structured as a packet processing system comprising a packet classification/forwarding system 402 and a packet modification system 404. The packet classification/forwarding system 402 has an ingress portion 406 and an egress portion 408 through which ingress (network-side) packets may respectively enter and exit the packet classification/forwarding system 402. Similarly, the packet modification system 404 has an ingress portion 410 and an egress portion 412 through which egress (switch-side) packets may respectively enter and exit the packet modification system 404.

The ingress portion 406 of the packet classification/forwarding system 402 is coupled, through interface 418, to one or more network-side devices 414, and the egress portion 408 of the packet classification/forwarding system 402 is coupled, through interface 420, to one or more switch-side devices 416. Similarly, the ingress portion 410 of the packet modification system 404 is coupled, through interface 422, to the one or more switch-side devices 416, and the egress portion 412 of the packet modification system 404 is coupled, through interface 423, to the one or more network-side devices 414.

In addition to the ingress and egress portions 406, 408, the packet classification system 402 further comprises a first packet parser 104 (the same packet parser 104 illustrated in FIG. 1), and a packet processor 428.

Parser 104 is configured to parse an ingress packet and provide context pointers to the beginning of the packet layers, for example, pointers to the beginning of OSI layers 2, 3, and 4.

Packet processor 428 is configured to classify and forward the packet, responsive to the context pointer provided by parser 104.

Content Addressable Memory (CAM) 442 is used by the packet classification/forwarding system 402 to perform packet searches to arrive at a classification/forwarding decision for a packet. The CAM 442 may be ternary, binary, or a combination of binary and ternary.

The associated RAMs (ARAMs) 444a, 44b provide associated data for each entry in the CAM 442. The ARAMs 444a, 444b are accessed using the address (index value) returned by the CAM 442 as a result of a search operation. The ARAM 444a, 444b entry data is used to supply intermediate classification/forwarding information for the packet that is used by the packet processor 428 in making a final classification/forwarding decision for the packet.

The table 120, which may or may not be stored on a CAM, and the associated data store 124, which collectively may be referred to as a Virtual Router Indirection Mapper (VRIM), are the same elements previously discussed in relation to FIG. 1.

In addition to the ingress and egress portions 410, 412, the packet modification system 404 further comprises a second packet parser 430 for parsing an egress packet, modification processor 432, a fragment processor 436, a third packet parser 436, Access Control Logic ("ACL") 438a, and L3/L4 checksum logic 438b Parser 430 is configured to parse an egress packet and provide context pointers to the beginning of the packet layers, for example, pointers to the beginning of OSI layers 2, 3, and 4.

Modification processor 432 modifies some or all of an egress packet responsive to the context pointers provided by parser 430, in the process disassembling the packet into fragments. Fragment processor 436 re-assembles the fragmented packet.

The modification RAMs ("MRAMs") 448a, 448b provides data and control structures for packet modification operations performed by the modification processors 432a, 432b Parser 436 is configured to parse the reassembled packet and provide context pointers to the beginning of the packet layers, for example, pointers to the beginning of OSI layers 2, 3, and 4.

ACL logic 438b arrives at an ACL decision with respect to a packet, such as CPU copy, mirror copy; and kill, responsive to the parsed packet layers provided by parser 436. The CPU copy action forwards a copy of the packet to a host 438 coupled to the system. The mirror copy action implements an egress mirroring function, in which a copy of the packet is forwarded to mirror FIFO 440 and then on to the egress portion 408 of the packet classification/forwarding system 402. The kill action either kills the packet or marks it for killing by a downstream Medium Access Control (MAC) processor.

L3/L4 checksum logic 438b is configured to compute a checksum for a modified packet. In one embodiment, logic 438b is configured to independently calculate a layer three (IP) and layer four (TCP/UDP) checksum.

In one implementation, the interfaces 418, 420, 422, 424, and one or more of the CAM, VRIM, ARAM, or MRAM interfaces (not identified, may be a QDR- or DDR-type interface as described in U.S. patent application Ser. No. 10/655, 742, filed Sep. 4, 2003, which is hereby fully incorporated by reference herein as though set forth in full.

In one embodiment, the logic elements depicted in FIG. 1 are incorporated into the router of FIG. 4 within the forwarding and classification system 402, just downstream from the packet parser 104 and parallel with the packet processor 428. In this embodiment, logic 112 in FIG. 1 performs the key generation step 302 of FIG. 3 responsive to parsed packet data provided by parser 104. Logic 112 also performs the optional key type generation and masking step 304 if a ternary CAM is not included in the VRIM 120, 124 and used as part of the indirection mapping process 306. If a ternary CAM is included in the VRIM 120, 124, and used as part of the indirection mapping process 306, the key type generation and masking step 304 may be performed by this CAM. Logic 126 further performs the indirection mapping process 306 in conjunction with the elements of VRIM 120, 124, as well as the VRID outputting step 308.

Packet processor 428 performs the configure device step 310 of FIG. 3 by using the VRID as the starting key to CAM 442, which determines the starting address of a sequence of commends executed by the packet processor 306 to make a classification and forwarding decision for an ingress packet. By using the VRID as the starting key to the CAM 442, the packet processor 428 implicitly selects a routing table from a plurality of possible routing tables, as illustrated in FIG. 5.

Packet processor 428 also performs step 312 by classifying and forwarding the ingress packet responsive to the CAM searching process that is performed, at least initially, with the key determined responsive to the VRID 102.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method, performed in, by or for a networking device, of presenting different virtual routers to different end users, classes of service, or packets comprising the steps of:
   receiving an incoming packet having a VLAN field and at least one additional packet field;
   forming a key from the VLAN field and the at least one additional packet field;
   mapping the key into a virtual router identifier using a two-step indirection mapping process, comprising a first step and a second step, the virtual router identifier identifying a particular virtual router configuration from amongst a plurality of possible virtual router configurations, each of which is characterized by a routing table, for use in routing packets at OSI layer three or higher, selected from a plurality of possible routing tables;
   the first step of the two-step indirection mapping process comprising accessing a table having a plurality of entries, each having a content value and an index value, and locating a matching entry having a content value that matches the key;

the second step of the two-step indirection mapping process comprising mapping the index value of the matched entry into the virtual router identifier by using the index value to identify an entry in an associated data store element containing or including the virtual router identifier;

configuring the device to have the particular configuration identified by the virtual router identifier by selecting the routing table that characterizes the particular configuration identified by the virtual router identifier for use in routing the packet at OSI layer three or higher; and routing the packet at OSI layer three or higher using the selected routing table that characterizes the particular configuration identified by the virtual router identifier, wherein the number of possible virtual routers is increased by mapping many different key values into the same virtual router identifier through appropriate settings of the index values.

2. The method of claim 1 wherein the key is a masked key.

3. The method of claim 1 wherein the key is an unmasked key.

4. The method of claim 1 wherein the key is masked using a key type determined responsive to one or more packet fields.

5. The method of claim 1 wherein the at least one additional packet field comprises a VMAN field.

6. The method of claim 1 wherein the at least one additional packet field comprises VMAN and ingress port fields.

7. The method of claim 1 wherein the at least one additional packet field comprises an ingress port field.

8. The method of claim 1 wherein the table is stored on a CAM, and the number of virtual routers is only limited by the memory size of the CAM.

9. The method of claim 3 wherein the key is masked by wildcarding one or more fields of entries of a ternary CAM.

10. A method, performed in, by or for a networking device, of presenting different virtual routers to different end users, classes of service, or packets comprising the steps of:

receiving an incoming packet having a VLAN field and at least one additional packet field;

forming a key from the VLAN field and the at least one additional packet field;

masking the key using a key type determined responsive to one or more packet fields;

mapping the masked key into a virtual router identifier using a two-step indirection mapping process, comprising a first step and a second step, the virtual router identifier identifying a particular virtual router configuration from amongst a plurality of possible virtual router configurations, each of which is characterized by a routing table, for use in routing packets at OSI layer three or higher, selected from a plurality of possible routing tables;

the first step of the two-step indirection mapping process comprising accessing a table having a plurality of entries, each having a content value and an index value, and locating a matching entry having a content value that matches the key;

the second step of the two-step indirection mapping process comprising mapping the index value of the matched entry into the virtual router identifier by using the index value to identify an entry in an associated data store element containing or including the virtual router identifier;

configuring the device to have the particular configuration identified by the virtual router identifier by selecting the routing table that characterizes the particular configuration identified by the virtual router identifier for use in routing the packet at OSI layer three or higher; and routing the packet at OSI layer three or higher using the selected routing table that characterizes the particular configuration identified by the virtual router identifier, wherein the routing table characterizing the particular configuration identified by the virtual router identifier is implicitly selected by determining, responsive to the virtual router identifier, a starting address of a sequence of commands that are executed by a packet processor to route the packet.

11. A method, performed in, by or for a networking device, of presenting different virtual routers to different end users, classes of service, or packets comprising the steps of:

receiving an incoming packet having a VLAN field and at least one additional packet field;

forming a key from the VLAN field and at least one additional packet field;

masking the key using a key type determined responsive to the ingress port field;

mapping the masked key into a virtual router identifier using a two-step indirection mapping process, comprising a first step and a second step, the virtual router identifier identifying a particular virtual router configuration from amongst a plurality of possible virtual router configurations, each of which is characterized by a routing table, for use in routing packets at OSI layer three or higher, selected from a plurality of possible routing tables;

the first step of the two-step indirection mapping process comprising accessing a table having a plurality of entries, each having a content value and an index value, and locating a matching entry having a content value that matches the key;

the second step of the two-step indirection mapping process comprising mapping the index value of the matched entry into the virtual router identifier by using the index value to identify an entry in an associated data store element containing or including the virtual router identifier;

configuring the device to have the particular configuration identified by the virtual router identifier by selecting the routing table that characterizes the particular configuration identified by the virtual router identifier for use in routing the packet at OSI layer three or higher; and routing the packet at OSI layer three or higher using the selected routing table that characterizes the particular configuration identified by the virtual router identifier, wherein the key type is determined by inputting an ingress port field of the packet to a lookup table, and wherein the number of possible virtual routers is increased by mapping many different key values into the same virtual router identifier through appropriate settings of the index values.

12. The method of any one of claims 1, 10 and 11 wherein the VLAN field is an ingress VLAN field.

13. The method of any one of claims 1, 10 and 11 wherein the VLAN field is an extended or super VLAN.

14. The method of any one of claims 10, 11 and 4 wherein the key is masked by wildcarding one or more fields of the key responsive to the key type.

15. The method of any one of claims 1- and 11 wherein the routing table characterizing the particular configuration identified by the virtual router identifier is implicitly selected by determining, responsive to the virtual router identifier, a starting address of a sequence of commands that are executed by a packet processor to route the packet.

16. The method of any one of claims 10 and 4 wherein the key type is determined by inputting an ingress port field of the packet to a lookup table.

17. A system, in or associated with a networking device, of presenting different virtual routers to different end users, classes of service, or packets comprising:
- first logic for receiving an incoming packet having a VLAN field and at least one additional packet field;
- second logic forming a key from the VLAN field and the at least one additional packet field;
- means for mapping the key into a virtual router identifier using a two-step indirection mapping process, comprising a first step and a second step, the virtual router identifier identifying a particular virtual router configuration from amongst a plurality of possible virtual router configurations, each of which is characterized by a routing table, for use in routing packets at OSI layer three or higher, selected from a plurality of possible routing tables;
- the first step of the two-step indirection mapping process comprising accessing a table having a plurality of entries, each having a content value and an index value, and locating a matching entry having a content value that matches the key;
- the second step of the two-step indirection mapping process comprising mapping the index value of the matched entry into the virtual router identifier by using the index value to identify an entry in an associated data store element containing or including the virtual router identifier; and
- one or more packet processors for (1) configuring the device to have the particular configuration identified by the virtual router identifier by selecting the routing table that characterizes the particular configuration identified by the virtual router identifier for use in routing the packet at OSI layer three or higher; and (2) routing the packet at OSI layer three or higher using the selected routing table that characterizes the particular configuration identified by the virtual router identifier,
- wherein the key is masked using a key type, the key type is determined by inputting an ingress port field of the packet to a lookup table, and wherein the number of possible virtual routers is increased by mapping many different key values into the same virtual router identifier through appropriate settings of the index values.

18. The system of claim 17 wherein the table is stored on a CAM, the first step of the two-step indirection mapping process comprises having a CAM search for and locate an entry whose content value matches the key, and the associated data store element comprises an associated RAM.

19. The system of claim 17 wherein the table is stored in a RAM, the first step of the two-step indirection mapping process comprises applying a hash function to the key to determine a table index for a starting entry, and then searching the table beginning with the starting entry to locate an entry whose content value matches the key.

20. The system of claim 18 wherein the CAM is a binary CAM.

21. The system of claim 18 wherein the CAM is a ternary CAM.

22. The system of claim 17 wherein the key is a masked key.

23. The system of claim 17 wherein the key is an unmasked key.

24. The system of claim 22 wherein the key is masked using a key type determined responsive to one or more packet fields.

25. The system of 24 wherein the key is masked by wildcarding one or more fields of the key responsive to key type.

26. The system of claim 22 wherein the key is masked by wildcarding one or more fields of entries of a ternary CAM.

27. The system of claim 17 wherein the routing table characterizing the particular configuration identified by the virtual router identifier is implicitly selected by determining, responsive to the virtual router identifier, a starting address of a sequence of commands that are executed by a packet processor to route the packet.

* * * * *